(12) United States Patent
Kuroda (10) Patent No.: US 6,268,979 B1
(45) Date of Patent: Jul. 31, 2001

(54) MAGNETIC RECORD MEDIUM HAVING A SPUTTER FORMED THIN FILM TEXTURE WITH SECOND PROJECTIONS OF A HEIGHT LOWER THAN FIRST PROJECTIONS

(75) Inventor: Yasunao Kuroda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/261,827

(22) Filed: Mar. 3, 1999

(30) Foreign Application Priority Data

Mar. 4, 1998 (JP) .................................................. 10-052125

(51) Int. Cl.[7] ...................................................... G11B 5/82
(52) U.S. Cl. .................................. 360/135; 428/694 TR
(58) Field of Search ........................ 360/135; 428/694 R, 428/694 T, 694 TR (56) References Cited

U.S. PATENT DOCUMENTS

| 5,928,759 | * | 7/1999 | Arita et al. ............................ | 428/141 |
|---|---|---|---|---|
| 5,976,714 | * | 11/1999 | Arita et al. ...................... | 428/694 TR |
| 5,978,189 | * | 11/1999 | Habu ..................................... | 360/135 |
| 6,020,045 | * | 2/2000 | Chen et al. ........................... | 428/141 |
| 6,025,310 | * | 2/2000 | Nishiguchi et al. ................. | 508/582 |
| 6,057,984 | * | 5/2000 | Arita et al. ............................ | 360/103 |

OTHER PUBLICATIONS

High–coercivity magnetic hard disks using glass substrates; Journal of Applied Physics; vol. 67, No. 9, Part 1, May 1, 1990.

* cited by examiner

*Primary Examiner*—Jefferson Evans
(74) *Attorney, Agent, or Firm*—Robert D. Buyan; Stout, Uxa, Buyan & Mullins, LLP (57) ABSTRACT

A magnetic recording medium includes a substrate, a data region and a CSS region on a surface of the substrate. Information is recorded in the data region, and a magnetic head is held stationary in the CSS region. A thin film texture is fabricated in the data region by sputtering, and a laser texture is fabricated in the CSS region by laser irradiation. The laser texture includes a plurality of first projections. The thin film texture includes a plurality of second projections. The second projections are lower in height than the first projections.

20 Claims, 3 Drawing Sheets

MAGNETIC RECORD MEDIUM HAVING A SPUTTER FORMED THIN FILM TEXTURE WITH SECOND PROJECTIONS OF A HEIGHT LOWER THAN FIRST PROJECTIONS

BACKGROUND OF THE INVENTION

The present invention relates to a magnetic recording medium such as a magnetic disk including a substrate. Information can be read out by a magnetic head from the surface of the medium. More specifically, the present invention relates to a magnetic record medium having an information recording density improved by minimizing the distance between the magnetic recording medium and the magnetic head.

The information recording density of magnetic disk devices has recently been increasing by as much as 60% every year. Effective approaches to increase the recording density include those intended to improve the characteristics of the magnetic recording medium or the head, the most effective one being to decrease the distance between the magnetic recording medium and the magnetic head while information is being read from or written on the medium.

When the magnetic recording medium is stopped, the head is held on a surface of the magnetic recording medium through contact with a region called a contact start stop (CSS)region. When a read/write instruction is provided to the magnetic disk unit, the disk unit rotates the recording medium and makes the head float above the recording medium. To reduce friction between the surface of the recording medium and the head, the surface of the substrate of the recording medium is embossed to provide favorable roughness, which is referred to as texture.

To fabricate the texture, if the recording medium has a low recording density, a method known as "scratch texture" is employed in which whetstone grain is used to scratch the substrate surface. As the demand for high-density recording medium increases, machining methods with higher precision are required. One such method is known as "laser texturing". This method uses laser light and can minimize the distance between the substrate and the magnetic head.

Conventionally, the laser texturing method has been primarily intended to form a texture in the CSS region but not in the data region, which serves as an information storage region in the recording medium. In this approach, the surface of the data region is made as flat as possible so that the distance between the substrate and the magnetic head is further reduced and a high recording density is achieved.

When the head is moved to a data region having no texture formed thereon, the flying characteristics of the head may be affected. This may result in the head colliding with the substrate in a seek operation, in which the head is moved to a desired position. Further, a protective film formed on the surface of the magnetic head or the recording medium may be damaged by the shock of the collision, which reduces the life of the magnetic disk device.

In addition, the head may collect lubricating agents, which are uniformly applied on the protective film. This lowers the friction characteristic of the magnetic head after the head is stopped in the CCS region. The lubricating agents that have been deposited on the head increase the static friction applied when the substrate starts to rotate. This leads to immobilization (sticktion) of the head on the substrate, and the substrate cannot be rotated.

The problem above is also influenced by the operational environment of the magnetic disk. Therefore, failure in the seek operation should be prevented so that the influence of the operational environment is eliminated as much as possible.

Accordingly, a method to fabricate the texture over the entire surface of the substrate has been proposed, which addresses the failure in seek operations. A method known as thin film texturing is used for a recording medium having a glass substrate in which fine projections are formed over its entire surface by a film of low melting point-metal surface by sputtering (Kogure, T., et al., "High-Coercivity magnetic Hard Disks Using Glass Substrates," J. Appl. Phys. 67(9) :4701(1990).)

This method, however, requires the texture to be formed having a height and a density greater than certain values such that the frictional force between the substrate and the magnetic head is reduced in the CSS region, where the magnetic head alternately touches and leaves the substrate. This requirement limits the degree to which the distance between the substrate and the magnetic head can be reduced.

The present invention has been made in view of the problems associated with the prior art. Accordingly, an object of the present invention is to provide a recording medium in which the contact of the substrate with the magnetic head can be prevented in the seek operation while the distance between the substrate and the magnetic head is minimized.

SUMMARY OF THE INVENTION

The present invention generally relates to a magnetic recording medium used in a magnetic disk device in which information recorded on the medium is read by a magnetic head and the head is stopped at a predetermined position on the recording medium upon completion of the read operation. The recording medium includes a substrate having a surface that includes a data region to record information. A magnetic film is formed over the data region. The surface of the substrate further includes a contact area. The magnetic head is brought into contact with the contact area when the head is stopped. A laser texture is formed on the contact area or on the contact area and the data region by irradiating laser light on the substrate. The laser texture includes plurality of first projections. A thin film texture is formed by a thin metal film on the data region or on the data region and the contact region. The thin film texture includes plurality of second projections, the height of which is lower than the first projections.

BRIEF DESCRIPTION OF DRAWINGS

Novel features of the present invention will become apparent particularly in the claim attached. The objects as well as the advantages of the present invention will be understood from the description of the best mode at present moment to carry out the invention with reference to the accompanying drawings.

BEST MODE FOR CARRYING OUT THE INVENTION

Embodiments of the present invention will now be described in detail.

Figure 1:
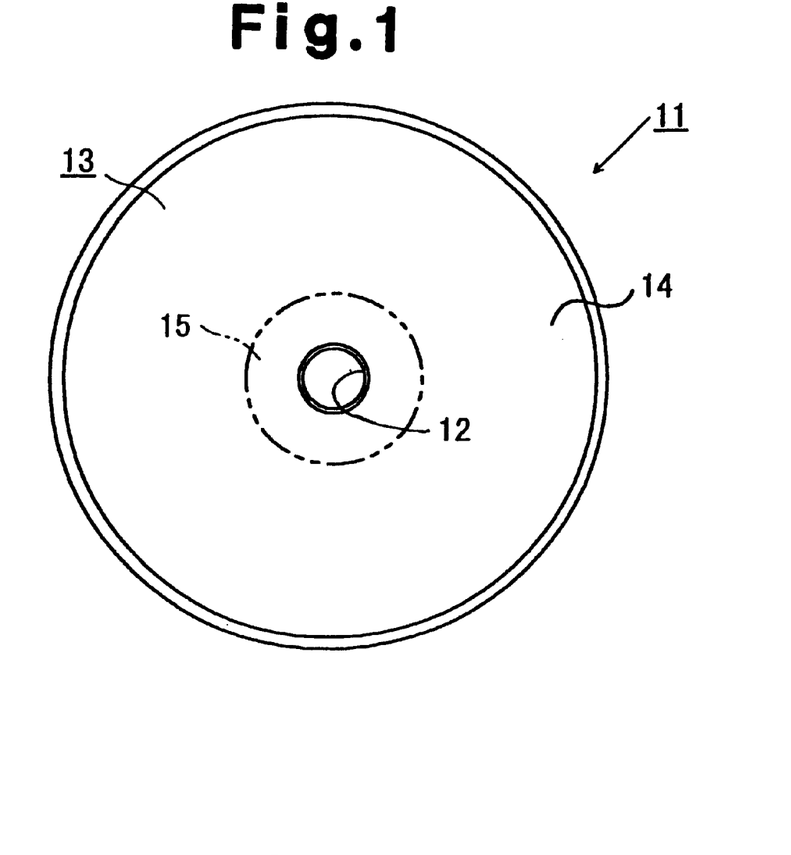
FIG. 1 is a front view showing a recording medium in an embodiment for carrying out the invention.

As shown in FIG. 1, a recording medium 11, or magnetic disk, includes a substrate 13 formed as a disk having a circular hole 12 in its center. A data region 14 to record information is located on the outer part of one surface of the substrate 13. A CSS region 15 is located on the surface of an inner part of the substrate 13, which is surrounded by the data region 14. The CSS region serves as a contact area on which the magnetic head is stopped. The substrate 13 of the medium 11 includes a plurality of components sequentially formed from a lower-most element: a laser texture 17, an underlying film for a thin film texture, a thin film texture 16, an underlying film for a magnetic film, a magnetic film, a protective film, and a lubricating film. The components not assigned with reference numerals are not shown in the drawings.

Figure 2:
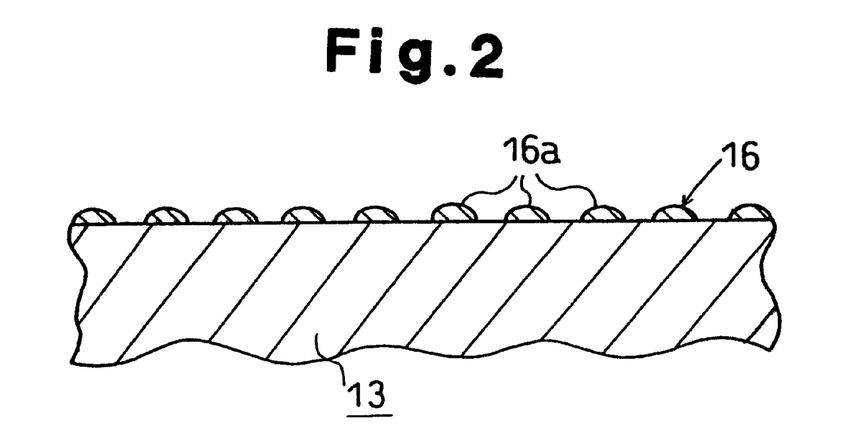
FIG. 2 is a enlarged partial cross-sectional view of a thin film texture.
Figure 3:
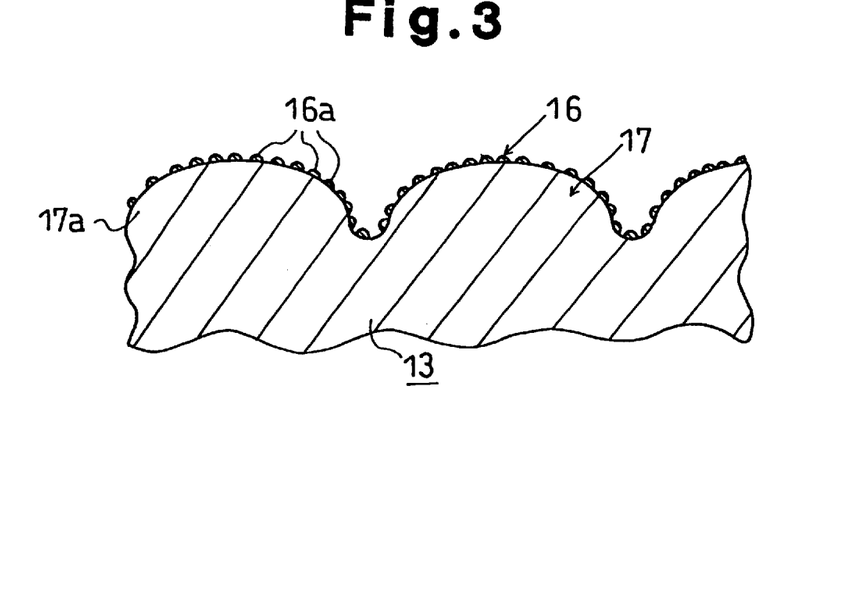
FIG. 3 is a enlarged partial cross-sectional view of a laser texture.

As shown in FIGS. 2 and 3, the thin film texture 16 is fabricated in the data region 14 and the laser texture 17 is formed in the CSS region 15 on the substrate 13.

The substrate 13 is made of such materials as aluminum (Al), an aluminum (Al)-magnesium (Mg) alloy, or carbon (C). Also, glass or crystalline glass, a type of glass ceramics, may be used.

When aluminum (Al), an aluminum (Al)-magnesium (Mg) alloy, or carbon (C) is used as the material for the substrate 13, the laser texture 17 can easily be fabricated, and it is preferred to plate a surface thereof with a nickel (Ni)-phosphorus (P) alloy. Of the materials above, the aluminum (Al)-magnesium (Mg) alloy is preferred because of its readiness for fabrication and machining.

When the substrate 13 is made of glass material, it has better rigidity than a substrate 13 made of aluminum. The glass substrate is free from deformation by shock. This is particularly favorable for a substrate 13 of a recording medium used in a small-sized magnetic disk recording device.

Preferred types of glass for the substrate 13 include soda-lime glass, which can be produced at low cost, aluminum silicate glass or borosilicate glass, which are weather resistant. Of these materials, soda-lime glass is commonly used in automobiles and is preferred because of its low price.

Preferred composition of soda-lime glass is as follows:

| | |
|---|---|
| Silicon oxide ($SiO_2$) | 70 to 74 weight % (major component) |
| Aluminum oxide ($Al_2O_3$) | 0 to 2.5 weight % |
| Iron oxide ($Fe_2O_3$) | 0.1 to 1.2 weight % |
| Titanium oxide ($TiO_2$) | 0 to 0.3 weight % |
| Magnesium oxide (MgO) | 3.0 to 4.5 weight % |
| Calcium oxide (CaO) | 6.5 to 9.5 weight % |
| Sodium oxide ($Na_2O$) | 12 to 14 weight % |
| Potassium oxide ($K_2O$) | 0 to 1.2 weight % |
| Cerium oxide ($CeO_2$) | 0 to 1 weight % |

The total amount of iron oxide, titanium oxide, and cerium oxide in the glass is preferably 0.2 weight % or more.

Strength and chemical durability of the glass deteriorate when the amount of silicon oxide in the soda-lime glass is less than 70 weight %. It is difficult to melt the glass when the silicon oxide content in the soda-lime glass exceeds 74 weight % or when aluminum oxide exceeds 2.5 weight %. Iron oxide in an amount of about 0.1% is commonly present in the glass as an impurity. Reducing the iron oxide content in the glass to 0.1% or less, therefore, increases the production cost. On the other hand, crystallization can readily take place when the iron oxide content in the glass is greater than 1.2 weight %.

Titanium oxide content greater than 0.3 weight % increases production cost. With a magnesium oxide content less than 0.3 weight %, it is difficult to melt the glass while the glass can easily crystallize. When the magnesium oxide exceeds 4.5 weight %, the glass may still readily crystallize. With a potassium oxide content of less than 12 weight %, the glass cannot be readily melted. When potassium oxide exceeds 14 weight %, the chemical durability of the glass worsens. Potassium oxide content exceeding 1.2 weight % makes it difficult to melt the glass and raises the cost. Cerium oxide content exceeding 1 weight % increases the cost.

It is preferred that the glass substrate 13 made of soda-lime glass be chemically strengthened to facilitate the forming of the laser texture 17 and the thin film texture 16 and to meet the strength requirement for the recording medium 11.

The preferred composition of aluminum silicate glass for the material of the glass substrate 13 is as follows:

| | |
|---|---|
| Silicon oxide ($SiO_2$) | 58 to 66 weight % (major component) |
| Aluminum oxide ($Al_2O_3$) | 13 to 19 weight % |
| Lithium oxide ($Li_2O$) | 3 to 4.5 weight % |
| Sodium oxide ($Na_2O$) | 6 to 13 weight % |
| Potassium oxide ($K_2O$) | 0 to 5 weight % |
| $R_2O$ (where $R_2O = Li_2O + Na_2O + K_2O$) | 10 to 18 weight % |
| Magnesium oxide (MgO) | 0 to 3.5 weight % |
| Calcium oxide (CaO) | 1 to 7 weight % |
| Strontium oxide (SrO) | 0 to 2 weight % |
| Barium oxide (BaO) | 0 to 2 weight % |
| RO (where RO = MgO + CaO + SrO + BaO) | 2 to 10 weight % |
| Titanium oxide ($TiO_2$) | 0 to 2 weight % |
| Cerium oxide ($CeO_2$) | 0 to 2 weight % |
| Iron oxide ($Fe_2O_3$) | 0 to 2 weight % |
| Manganese oxide (MnO) | 0 to 1 weight % |

The total amount of $TiO_2$, $CeO_2$, $Fe_2O_3$, and MnO contained in the glass is preferably in the range from 0.01% to 3%.

$SiO_2$ is the principal, essential component in the aluminosilicate glass. When its amount is less than 58 weight %, the water resistance of the glass after an ion exchange in an chemically strengthening process worsens. The strengthening process will be described later. When the $SiO_2$ content exceeds 66 weight %, the viscosity of the molten glass becomes so large that melting and molding the glass is difficult and the expansion coefficient becomes unfavorably small. $Al_2O_3$ is necessary to increase the ion exchanging rate and to improve the water resistance after the ion exchange. When the $Al_2O_3$ content is less than 13 weight %, however, such effects are insufficient. An $Al_2O_3$ content exceeding 19 weight % considerably increases the molten glass viscosity. This makes it difficult to melt and mold the glass and results in an expansion coefficient that is too small.

$Li_2O$ is an essential constituent in the glass material to allow ion exchange and to increase the meltability of the glass. With the $Li_2O$ content less than 3 weight %, sufficient surface compressive stress can not be achieved nor can the desired glass meltability be obtained after the ion exchange. If the $Li_2O$ content is greater than 4.5 weight %, the water resistance of the glass worsens after the ion exchange and the liquid phase temperature of the glass rises, making the molding of the glass difficult. $Na_2O$ is a component to increase the glass solubility. With the $Na_2O$ content less than 6 weight %, however, such effect is insufficient. With the $Na_2O$ content exceeding 13 weight %, the water resistance worsens after the ion exchange. $K_2O$ is a component to increase the glass meltability. $K_2O$, however, is known to lower the surface compressive stress after the ion exchange and therefore, is not necessarily required. The preferred amount of $K_2O$ is 5 weight % or less.

With the total amount of $R_2O$ ($Li_2O+Na_2O+K_2O$) less than 9 weight %, the viscosity of the molten glass becomes unfavorably high. This makes melting and molding the glass difficult and makes the expansion coefficient of the glass unfavorably small. If the $R_2O$ content exceeds 18 weight %, the water resistance is reduced after the ion exchange.

MgO is a constituent to increase meltability of the glass. With the MgO content greater than 3.5 weight %, the liquid phase temperature of the glass rises, which makes it difficult to mold the glass. CaO is a component to increase the meltability of the glass, and is necessary to adjust the ion exchanging rate. When the CaO content is less than 1 weight %, however, these effects are insignificant. With the CaO content exceeding 7 weight %, the liquid phase temperature rises considerably, making it difficult to mold the glass. SrO and BaO are components to increase the meltability and are effective to lower the liquid phase temperature. When the amount of these components exceed 2 weight %, the glass density increases and the production cost is increased.

When the total amount of RO (MgO+CaO+SrO+BaO) is less than 2 weight %, the viscosity of the molten glass becomes unfavorably high, making melting and molding the glass difficult. When the CaO content is greater than 10 weight %, the liquid phase temperature goes up, which renders the molding of glass difficult.

$Fe_2O_3$ is present in the molten glass in the forms of $Fe^{2+}$ and $Fe^{3+}$ ions, which are in equilibrium. The ions considerably affect the light transmittance of the molten glass, particularly in the infrared range. When the $Fe_2O_3$ content is greater than 2 weight %, the molten glass absorbs excessive amount of light in the infrared range. If this is the case, it is no longer possible to control the temperature distribution of the glass when the glass is melted or molded. This may lower the quality of the product.

$TiO_2$, $CeO_2$, or MnO affects the equilibrium state between $Fe^{2+}$ and $Fe^{3+}$, and interacts with these ions to change the light transmittance. When the amount of $TiO_2$ exceeds 3 weight %, or $CeO_2$ and MnO each exceed 1 weight %, the quality of the glass substrate decreases and the production cost increases.

It is preferred to chemically strengthen the aluminosilicate glass substrate 13, as in the case of the soda-lime glass, to provide the strength required for the recording medium 11 and to facilitate the forming of the laser texture 17 and the thin film texture 16.

The underlying films for the thin film texture 16 and for the magnetic film are both made of chromium or chromium alloy and are fabricated by means of sputtering or chemical vapor deposition (CVD). The thickness the underlying film is from about 2 to about 300 nm.

The magnetic film is overlaid on the underlying film, which serves as a substrate for the magnetic film, by sputtering or plating using cobalt (Co)-nickel-phosphorus, cobalt-nickel, or γ-iron oxide ($Fe_2O_3$). The thickness of the magnetic film is 100 nm or less.

The protective film is preferably strong enough to bear the shock that is applied when the magnetic head hits the recording medium. Further, the protective film is preferably such that the friction that exists from the moment the magnetic head comes into contact with the film until the moment the head comes to stop is minimized and the friction that exists when the substrate 13 starts to rotate when the head is still is minimized. Materials that meet these requirements include silicon oxide ($SiO_2$) and carbon (C). A protective layer of these materials, which has a thickness of at least 50 nm, is formed on the magnetic film, with a thickness of at least 50 nm, by means of sputtering or CVD. Alternatively, the protective layer of silicon oxide ($SiO_2$) may be formed by means of a spin coating using a sol/gel material.

The lubricating film decreases the shock that occurs upon the contact of the head with the substrate and reduces the dynamic friction force, which acts until the substrate 13 comes to complete stop. Materials for the lubricating layer should be selected depending on the materials of the protective film, since the lubricating film is formed by uniformly spreading lubricants on the surface of the recording medium 11. It should be taken into consideration that the recording medium 11 may be treated with heat. Materials that meet these requirements include resin lubricants that contain fluorine.

As shown in FIG. 2, the thin film texture 16 is located between the underlying film for the thin film texture (not shown) and the underlying film for the magnetic film (not shown), and includes a thin metal film having a number of second projections 16a formed by means of sputtering or CVD. Each of the second projections 16a is substantially circular when viewed from the top. Layers are formed when a magnetic film is overlaid on the second projections 16a formed on the surface of the metallic thin film. These second projections 16a produce the thin film texture 16.

The texture 16 comprises second projections 16a arranged in substantially regular fashion. Following application of all of the films, the contour of the texture 16 is determined by a process referred to herein as a contaminant exclusion. This process will be described later. Preferably, the second projections 16a have an average height of between 1 and 50 nm after the contaminant exclusion process has been performed. If the average is less than 1 nm, the thin film texture 16 does not perform its intended functions, and the magnetic head comes into contact with a surface of the recording medium 11 during the seek operation. If the average exceeds 50 nm, on the other hand, the distance between the magnetic head and the recording medium 11 becomes too large and the information recording/reproducing performances of the recording medium 11 are lowered.

The average diameter of the second projections 16a is preferably between 0.1 and 1 μm after the contaminant exclusion process. When the average diameter is less than 0.1 μm, it is difficult to ensure stable production of the uniform thin film texture 16. If the average diameter exceeds 1 μm, the magnetic head does not float up from the recording medium when the magnetic head comes into contact the data area 14.

The average distance between the second projections 16a after the contaminant exclusion process is preferably between 0.2 μm and 10 μm. If the average is less than 0.2 μm, it takes longer to fabricate the thin film texture 16 and productivity is lowered. If the average exceeds 10 μm, the magnetic head can not immediately float up from the recording medium when the magnetic head contacts the data area 14.

Referring to FIG. 3, the laser texture 17 includes a number of first projections 17a formed on the substrate 13 by a texture fabrication process using laser light, which will be described later. Each first projection 17a is substantially circular when viewed from the top. The first projections 17a, formed on the surface of the substrate 13, have layers formed thereon which comprise a plurality of films including the magnetic film. The first projections 17a comprise the laser texture 17.

The laser texture 17 comprises a number of the first projections 17a that are substantially regularly arranged. Following application of all of the films, the contour of the texture is determined by a contaminant exclusion process, which will be described later. The first projections 17a, after the contaminant exclusion process, preferably have an average height between 5 and 100 nm. If the average is less than 5 nm, adhesion between the texture and the magnetic head becomes stronger. If the average height exceeds 100 nm, the magnetic head can not be held at a sufficiently small distance from the medium. More preferably, the average is in the range of from 10 to 50 nm.

There is a strong relationship between the diameter of the first projections 17a of the laser texture 17 and the density of the laser texture 17. When the texture density is excessively high, the lubricating film located between the laser texture 17 and the magnetic head contributes to the static friction between the magnetic head and the substrate 13. In such a case, the magnetic head adheres to the laser texture 17 due to the surface tension of the lubricating film. This lowers the CSS characteristics. Further, if the texture density is smaller than a certain value, the contact area between the magnetic head and the texture becomes smaller. This increases the shock applied to each texture part upon contact of the head with the recording medium, which shortens the life of the magnetic disk. The distance between the first projections 17a and diameter thereof should be determined taking these requirements into account.

The average distance between the first projections 17a is preferably from about 1 to about 100 $\mu$m after the contaminant exclusion. If the average is less than 1 $\mu$m, it takes much time to form the laser texture 17, lowering productivity. If the average is greater than 100 $\mu$m, on the other hand, the density of the laser texture 17 decreases. More preferably, the average is in the range of from about 2 to about 50 $\mu$m.

The first projections 17a, after the contaminant exclusion process, preferably have an average diameter in the range of from 1 to 20 $\mu$m. If the average diameter is less than 1 $\mu$m, it is difficult to ensure stable forming of uniform texture. If the average diameter is greater than 20 $\mu$m, on the other hand, the CSS characteristic is lowered. In view of performance and productivity, the average diameter is preferably from about1 to about 10 $\mu$m.

A method for forming the thin film texture 16 over the data region 14 will now be described. The texture 16 may be formed over the CSS region as well. Requirements for forming the thin film texture 16 include:

1) it is not necessary to consider the problem of abrasion since the magnetic head operates without stopping;
2) the texture density should be such that it allows the magnetic head to immediately float up from the surface of the recording medium when the head accidentally touches the recording medium during a seek operation; and
3) the height of the thin film texture 16 should be small enough to prevent the deposition of the lubricant on the magnetic head in order to achieve a high recording density.

As a means to meet the three requirements above, the thin film texture 16 may be formed, using a sputtering process, as a film of a low melting point metal. The metal preferably has a melting point between 150° C. and 600° C. Such metals include aluminum (Al), tin (Sn), antimony (Sb), bismuth (Bi), and lead (Pb).

In the formation of the thin film texture 16, the height and density of the second projections 16a may be controlled by setting proper values for the film forming temperature, the discharge power, and the gas pressure. By setting the height and density of the second projections 16a lower than that of the conventional thin film texture 16, the distance between the recording medium and the magnetic head is minimized and the failures in the seek operation can be eliminated.

A method for forming the laser texture in the CSS region 15 will now be described.

When forming the laser texture 17 on the aluminum substrate 13, the surfaces of which are plated with a nickel-phosphorus alloy, an Nd:YAG laser, which has a stable power output and can thus be handled easily, is often employed so that the nickel-phosphorus alloy can efficiently absorb laser energy in any wavelength band.

When the laser beam heats the surface of the substrate 13, the nickel-phosphorus alloy and aluminum melt and deform, resulting in the first projections 17a. The first projections 17a have a shape resembling a caldera or a sombrero depending on the amount of the irradiated energy. "Caldera" refers to a projection having a recessed center and a ring extending about the recessed center. "Sombrero" refers to a projection having a protruding center and an annular valley extending about the protruding center.

Forming the laser texture 17 on the glass substrate 13 will now be described. The wavelengths of laser beams absorbed by the glass substrate 13 are limited. Therefore, a method employing a carbon oxide laser, in which glass material that forms a base absorbs light, or a method using colored glass to efficiently absorb short-wavelength light is employed.

When using the colored glass, which efficiently absorbs light with short wavelengths, either the second highest harmonic (SHG:532 nm) or the fourth highest harmonic (FHG:266 nm) of the Nd:YAG laser is used depending on the type of coloring agent.

When a laser beam having a wavelength in the ultraviolet band is used to form the texture with a laser beam, the spot diameter of the laser beam can easily be adjusted. Hence, small diameter texture elements can be formed. Accordingly, when the texture is formed on a substrate 13 made of colored glass, it is most preferred to use the fourth highest harmonic (FHG: 266 nm) of the Nd:YAG laser, which is in the ultraviolet band.

A stable texture may be formed on a glass substrate 13 containing certain metal oxide species. Oxides of transitional metals are primarily used as such metal oxides. Among such metal oxides are titanium oxide, vanadium oxide, chromium oxide, manganese oxide, iron oxide, cobalt oxide, nickel oxide, copper oxide, molybdenum oxide, wolfram oxide, or cerium oxide. Of these metal oxides, iron oxide, copper oxide, titanium oxide, and cerium oxide are more preferred since desired projections 17a can be formed on the surface of the glass substrate 13 using a laser beam. Iron oxide is even more preferred because of its high cost performance. Of the iron oxides, ferric oxide is most preferred, since it ensures proper forming of the desired first projections 17a with a laser.

The amount of ferric oxide in the glass substrate 13 is preferably from 0.1 to 11.7 weight %. When a method referred to herein as a floating method and described later is employed, the preferred ferric oxide amount is from 0.3 to 0.9 weight %. When the ferric oxide content is less than 0.3 weight %, the shape of the laser texture deviates and predetermined shapes can hardly be achieved. When the content exceeds 0.9 weight %, the glass substrate 13 may not be properly shaped.

Oxides of the transition metals color the glass and allow the glass substrate 13 to effectively absorb light having short wavelengths. Certain metal oxides can thus be used as coloring agents. In particular, adding the above-mentioned oxides of the transition metals provides the glass with a high absorbance for the light in ultraviolet spectrum. The laser beam irradiated on the glass, therefore, is efficiently absorbed by the outer-most surface of the glass.

With regard to the absorbance of the glass substrate 13, if the glass has an absorbance of, for example, 20 $mm^{-1}$ at 266 nm, a texture having uniform projections can be formed. In order to make use of low-power lasers, the preferred absorbance is greater than 50 $mm^{-1}$, and more preferably, 100 $mm^{-1}$. When the absorbance is too high, however, the glass may vaporize or crack. The absorbance is preferably less than 2000 $mm^{-1}$, and more preferably less than 1000 $mm^{-1}$, and even more preferably, less than 300 $mm^-$. Accordingly, absorbance of the glass is preferably in the range of from 20 $mm^{-1}$ to 2000 $mm^{-1}$, and more preferably, from 50 $mm^{-1}$ to 1000 $mm^{-1}$, and even more preferably, from 100 $mm^{-1}$ to 300 $mm^{-1}$.

When a laser light is irradiated onto a glass substrate 13 capable of effectively absorbing laser light in an ultraviolet spectrum, small areas of the outer-most surface of the glass substrate 13 are quickly heated and soften. If the irradiated laser light has an appropriate energy density, the heated portions expand by thermal expansion to form first projections 17a without evaporating or vaporizing. When the irradiation of laser light ceases, the small areas, which are heated to a high temperature, quickly cool down and solidify while their heat-expanded portions remain unchanged. Each of the areas irradiated by the laser light swells to form a hemispherical shape that comprises one of the first projections 17a.

The preferred method of forming the glass substrate 13 is called the float method. Particularly, the soda-lime glass has a low melting temperature, good water-resistance, and good weather-resistance, after the chemical strengthening process has been applied. Moreover, the glass has an expansion coefficient that allows use of the glass in combination with metallic products.

The float method is a glass manufacturing method in which a bath containing molten tin is used, and the upper space of the bath is filled with a reductive atmosphere. In this method, molten glass is poured onto the bath filled with molten tin from one side of the bath, and the glass is drawn out from the other side of the bath and stretched into a planar shape. In the float method, the top and bottom surfaces of the produced glass plates are formed parallel to each other. Also, the glass plate is free of distortion, and has surface gloss. Mass-production of such glass plates is possible. Further, the glass plate so produced is free of residual internal stress. By using the glass plate in manufacturing the glass substrate 13, handling of the plate can be facilitated. For example, cracking is minimized when the substrate 13 is polished.

The chemical strengthening process is a method in which glass is chemically strengthened. In this method, the glass is soaked in molten salt. Metal ions with valence number 1 are present in the molten salt. The radius of the metal ions in the molten salt is larger than that of the other kind of metal ions present in the glass, which also have valence number 1. The metal ions in the glass are exchanged with those in the molten salt when the glass is placed in the molten salt.

For example, when the glass substrate 13 is placed in heated molten potassium nitrate, sodium ions present in proximity of the surface of the glass substrate 13 are replaced with potassium ions having a larger ion radius than the sodium ions. As a result, compressive stress acts upon the surface of the glass substrate 13 and strengthens the surface. Alternatively, the glass substrate may be soaked in mixed molten salt of silver nitrate (0.5 to 3 weight %) and potassium nitrate (97 to 99.5 weight %) for from 30 minutes to one hour. As a result, silver readily permeates into the surface of the glass substrate 13 to further strengthen the surface.

As described above, when the magnetic film and the protective film are formed by sputtering, small particles generated during the forming of the film may stick to the surfaces of each film. A contaminant exclusion process is employed to remove the particles. This process, in which particles that are stuck to the surfaces are physically removed, includes a roller brushing method, or an air tape burnishing (ATB) method.

Figure 4:
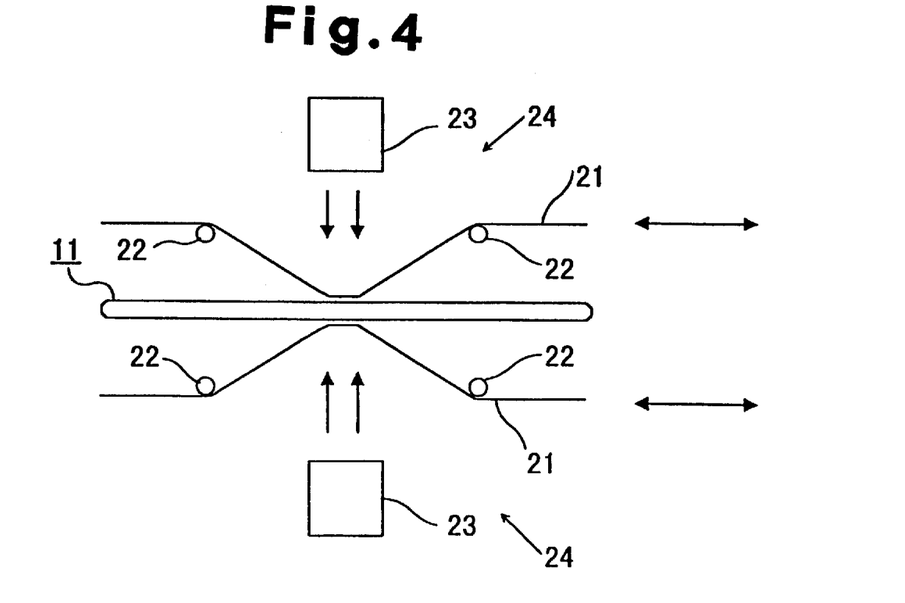
FIG. 4 is a schematic diagram showing a contaminant exclusion apparatus used in an ATB method.

As shown in FIG. 4, a pair of polishing tapes 21, each having fine grid, is used in the air tape burnishing method. The tapes 21 are arranged on both sides of a recording medium 11, and each is advanced along the medium 11 by rollers 22. A pair of air nozzles 23 is arranged outside of the polishing tapes 21, to blow compressed air onto the tapes 21 to push the tapes against the recording medium 11.

Unit 24, which includes the polishing tapes 21, the rollers 22, and the air nozzles 23, reciprocates along the recording medium 11 and pushes the polishing tapes 21 against the overall surfaces of the recording medium 11. As the rollers 22 advance the tapes 21 and the unit 24 reciprocates, contaminant exclusion process is performed on the recording medium 11. During the process, lubricants may be transferred to the polishing tapes 21 from the surface of the recording medium 11, and the top portions of the second and first projections 16a and 17a may be abraded. Therefore, the thickness of each film and the heights of the second and the first projections 16a and 17a are determined taking into consideration the part removed by the polishing.

The recording medium 11 according to the present invention is generally placed in a magnetic disk unit. While not in operation, the magnetic read/write head contacts the CSS region 15, which is formed on the inward surface of the recording medium 11, and is held stationary thereon.

In the seek operation, in which information is written on or read from the medium, a read/write command is provided to the magnetic disk unit. The magnetic head floats up in response to the command and moves to a desired position on the data region 14, which is arranged outwardly on the recording medium 11. Upon completion of the write/read command, the magnetic head moves back to the CSS region 15. Then, after the rotation of the medium 11 is stopped, the head lands on the CSS region 15 and is held stationary thereon.

While the medium 11 is not moving, immobilization of the magnetic head by the lubricant is prevented since the CSS region 15 has the laser texture 17, which has a predetermined density and height. In addition, the frictional force between the magnetic head and the medium 11 at the moment the head leaves or lands on the medium 11 is lowered since the laser texture 17 reduces the contact area between the head and the recording medium 11.

Moreover, contact between the data region 14 and the magnetic head is prevented during the seek operation, since the data region 14 has the thin film texture 16, which has a predetermined density and height. Moreover, when the head is forced down on the texture 16, the magnetic head can easily float up therefrom. Since height of the texture 16 is formed lower than the laser texture 17, the distance between the magnetic head and the recording medium 11 is minimized.

Advantages obtained by the embodiments above will be described hereinbelow.

According to the recording medium 11 of the present embodiment, a laser texture 17 is formed in the CSS region 15, and a thin film texture 16 is formed in the data region 14. The second projections 16a in the thin film texture 16 are formed lower than the first projections 17a in the laser texture 17. Accordingly, contact between the substrate 13 and the magnetic head in the seek operation is prevented and the distance therebetween is decreased.

According to the recording medium 11 of the present embodiment, the first projections 17a, which are formed in the CSS region 15, have an average height of from 5 to 100 nm and an average diameter of from 1 to 20 µm. The average distance between the projections is from 1 to 20 µm. This enables the laser texture 17 to be easily and precisely fabricated, and the laser texture 17 is not easily influenced by shock applied when the head floats up from or lands on the medium 11.

According to the recording medium 11 of the present embodiment, the second projections 16a, which are formed in the data region, have an average height of from 1 to 50 nm, an average diameter of from 0.1 to 1 µm, and the average distances between the projections is from 0.2 to 100 µm. Accordingly, contact between the substrate 13 and the magnetic head in the data area 14 is prevented, while the distance between the substrate and the head is minimized.

According to the recording medium 11 of the present embodiment, absorption of laser light by the substrate 13 is facilitated by the substrate 13, which has an absorbance from $20^{-1}$ to 2000 mm$^{-1}$. This permits fabrication of the laser texture 17 with high precision.

According to the recording medium 11 of the present embodiment, the substrate 13 is made from soda-lime glass and has smooth surfaces. Such a substrate 13 is also less costly and the likelihood of cracking is reduced.

According to the recording medium 11 of the present embodiment, the thin film texture 16 can be easily and appropriately formed on the surface of the substrate 13, since the second projections 16a are fabricated by sputtering.

According to the recording medium 11 of the present embodiment, the thin metal films are formed from aluminum, a metal having a low melting point. This allows sputtering at low temperatures, making the production process simple.

According to the recording medium 11 of the present embodiment, the glass substrate 13 is fabricated by the float method. This allows mass-production of flat-surfaced glass substrate 13 while reducing production cost.

According to the recording medium 11 of the present embodiment, the glass substrate 13 contains ferric oxide. This results in the light absorption coefficient of the substrate 13 being the range of from 20 mm$^{-1}$ to 2000 mm$^{-1}$.

EXAMPLES

Referring next to FIGS. 1 to 6, the above embodiments will be described by means of examples. The examples are intended to be illustrative rather than exhaustive.

Iron oxide was added to soda-lime glass having the composition (weight %) in Table 1, and the glass plate was fabricated by the float method so that the amount of iron oxide in the mixture is 1.3 weight % (in terms of ferric oxide content). Next, the glass plate was cut into disk-shaped glass substrates 13. The surfaces of each substrate 13 were abraded until each smooth and until a desired thickness was obtained. Each disk was 2.5 inches (about 63.5 mm) in diameter and had a thickness of 0.635 mm. The absorbance of each substrate 13 was 240 mm$^{-1}$.

TABLE 1

| Constituent | Weight % |
|---|---|
| $SiO_2$ | 71.3 |
| $Al_2O_3$ | 1.5 |
| MgO | 3.7 |
| CaO | 9.0 |
| $Na_2O$ | 13.5 |
| $K_2O$ | 1.0 |

The glass disk substrates 13 were chemically strengthened by being soaked in a molten salt mixture of potassium nitrate and sodium nitrate, which had a melting temperature between 400° C. and 500° C., for about 2 hours to 4 hours. The substrates 13 were then cooled and rinsed.

Figure 5:
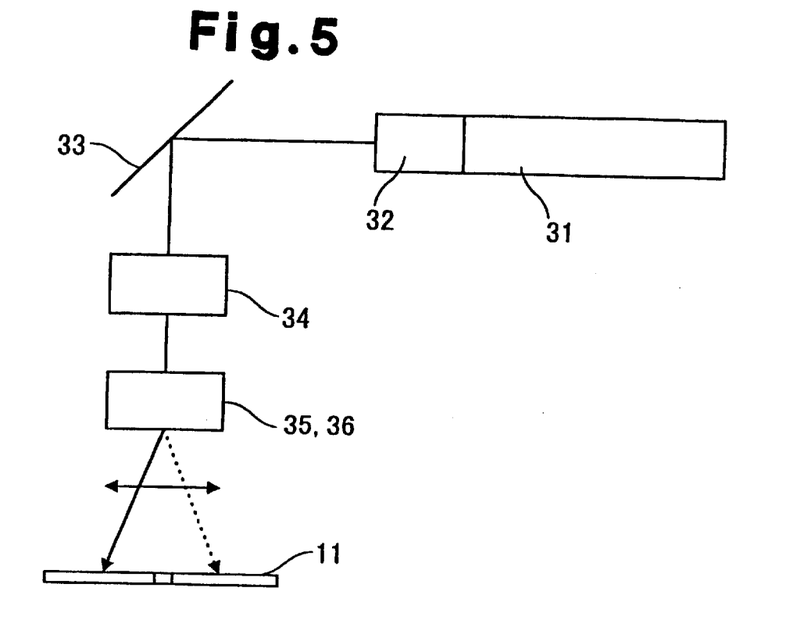
FIG. 5 is a schematic diagram showing a laser light emitter.

Using an apparatus shown schematically in FIG. 5, a laser texture 17 was then formed on the glass disk substrates 13 in the area defined between two circles, each concentric to the disk, one having a radius of 12.5 mm and the other having a radius of 17.5 mm. The area served as a CSS region 15. A YAG pulse laser emitter was used as a light source 31 for laser processing. Laser light emitted from the light source 31 was converted by SHG element 32 to light having a wavelength that was half that of the light emitted from the source. The converted light was deflected by a fixed mirror 33 and entered an FHG element 34. The FHG element 34 further reduced the wavelength of the light by half. The light after the conversion had a wavelength of 266 nm, which is in the UV region. A galvanomirror 35 and a focusing lens 36 focused the UV laser light on a predetermined position on the surface of each glass disk substrate 13.

The amount of energy of the ultraviolet laser, which had a wavelength of 266 nm, was adjusted to 1.5 µJ to 2.0 µJ per irradiation so that a single irradiation of the laser formed a single first projection 17a of the laser texture 17. The laser light 17 was adjusted to have a spot diameter of about 10 µm so that the diameter of each projection formed would be about 3 µm.

After the laser texture 17 had been fabricated on the substrate, the substrate was again precision-rinsed and a film was formed by means of sputtering. The sputtering was applied on the surface of the substrate 13 to form an aluminum thin film, an underlying film for magnetic film, a magnetic film, and a protective film. The protective film was formed of silicon oxide (20% silicon content). A thin film texture 16 was further overlaid on a surface of the laser texture 17 in the CSS region 15.

Immediately after the film forming step using sputtering was completed, a lubricant was coated on the surface of each glass disk substrate 13 on which the films had been formed. In the coating process, each substrate 13 was dipped into a lubricant (AM2001, Montegison), which was prepared in advance, and was removed at a predetermined speed. Each substrate 13, which was uniformly coated with lubricant, was sintered in a furnace to further improve the uniformity of the lubricant film. This completed a recording medium 11.

Contaminants deposited on the surface of the recording medium 11 in the above sintering step were removed by means of the air tape burnishing (ATB) method as schematically shown in FIG. 4. In the ATB method, settings were such that the abrading tapes 21 were fed at a speed of 30 mm/min, the recording medium 11 was rotated at 125 rpm, the unit 24 was reciprocated at a speed of 500 mm/min, and the number of reciprocations was one.

The surface of the recording medium 11 produced in the above manner was observed using a polarizing microscope and ZYGO (CANON HANBAI) to evaluate the contours of the first and second projections 17a and 16a and the thicknesses of the protective film and the lubricating film. The results are shown in Tables 2 and 3. In table 2, all of the figures regarding the shapes of the first and second projections 17a and 16a represent averages.

TABLE 2

|  | $1^{st}$ projections | 2nd projections |
| --- | --- | --- |
| Texture density ($mm^{-2}$) | 2500 | $4 \times 10^6$ |
| Texture height (nm) | 30 | 27 |
| Texture diameter ($\mu m$) | 3 | 0.2 |

TABLE 3

|  | Protective film | Lubricating film |
| --- | --- | --- |
| Thickness (nm) | 16 | 2.4 |

Parameters such as various conditions for the laser texture fabrication, dimensions, thickness of the lubricants, and the various conditions for contaminant exclusion were optimized in view of quality control so as to minimize the sum of static and dynamic frictions.

For the recording medium produced in accordance with the above settings, CSS characteristics were evaluated by measuring the static friction coefficient ($\mu s$) and the dynamic friction coefficient ($\mu f$) at a point 15 mm away from the center of the disk using a 50% slider head having a head load of 3.5 gf. The results are shown in FIG. 4. The test was intended to assess the durability of the protective film against wear in the CSS region 15. The dynamic friction coefficient is discontinuous at 50,000 CSS operations since the system was stopped during the CSS test when the number of CSS operations reached 50,000, and the test was then restarted.

Figure 6:
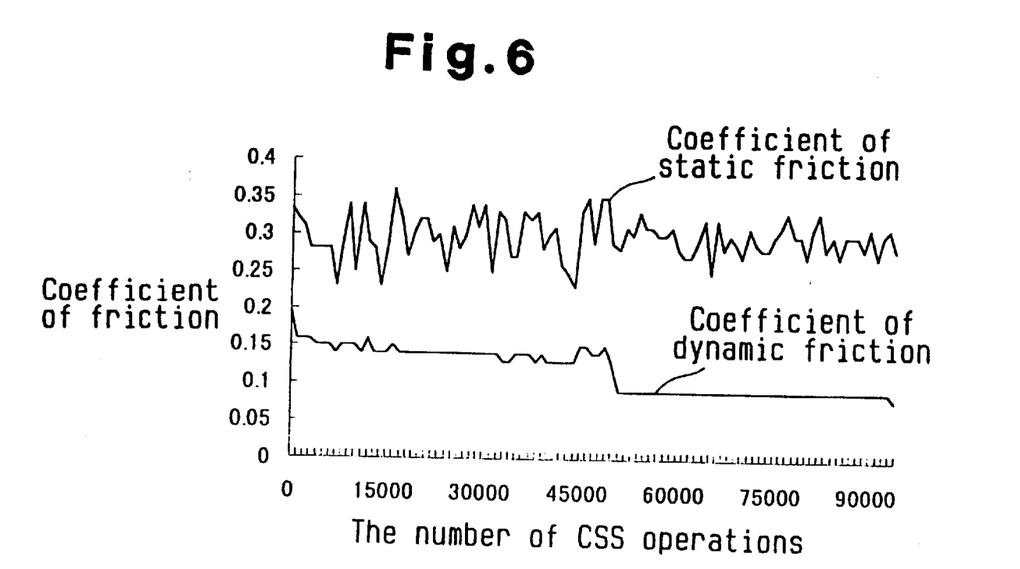
FIG. 6 is a graph showing a relationship between the number of CSS operations and frictional coefficients.

As can be seen from FIG. 6, even when the thin film texture 16 is formed on top of the laser texture 17, the thin film texture 16 did not appear to be actively worn or destroyed. Also, since the initial friction coefficient did not increase with respect to the number of CSS operations, the protective film showed little wear.

Table 4 below shows seek characteristics of the present example. The same head used in the CSS measurement was used, and the measurement was taken at a room temperature.

TABLE 4

|  | Initial state | After 25 hour seek | After 16 hour |
| --- | --- | --- | --- |
| Adhesive force (gf) | 1.16 | 1.31 | 1.18 |
| Coefficient of friction | 0.33 | 0.37 | 0.34 |

As shown in Table 4, friction coefficient was initially 0.33 and was 0.37 after the seek operation, showing substantially no change. The results show that the friction characteristics are hardly influenced by deposition of lubricants on the magnetic head or by wear that results from collisions of the magnetic head with the recording medium 11.

Alternatively, the present embodiment may be modified as follows:

In the recording medium 11 of the present embodiment, at least one of the underlying film for the thin film texture and the underlying film for the magnetic film, which is otherwise arranged on the surface of the glass substrate 13, may be dispensed with. The manufacturing processes can be simplified and the production cost can be lowered in this way.

In the recording medium 11 of the present embodiment, a magnetic film may be formed beneath the thin film texture 16. Not only are substantially the same effects obtained as in the present embodiment, but the read/write performances are improved by flattening the surface of the magnetic film.

In the recording medium 11 of the present embodiment, the protective film may be dispensed with. Not only are substantially the same effects obtained, but the production costs are reduced by simplifying the production process and reducing the cost of materials.

As described in detail above, according to the present invention, the height of the second projections in the thin film texture was made lower than that of the first projections in the laser texture by arranging the thin film texture in the data region and the laser texture in the contact region. This not only prevents contact between the magnetic disk substrate and the magnetic head during the seek operation but also minimizes the distance between them.

Further, according to the present invention, the laser texture can be formed easily and precisely. Not only is contact between the substrate and the magnetic head prevented during the seek operation, but the distance between them can more easily be reduced.

Also, the laser texture can be formed easily and precisely since the laser texture is formed by setting a range for the values that determine the shape of the first projections. Not only is contact between the substrate and the magnetic head prevented during the seek operation, but the distance between the substrate and the magnetic head can more easily be minimized.

Further, the laser texture can be formed more precisely using a laser light with a wavelength in the UV region, since the substrate has a predetermined absorbance. A substrate having a desired strength and smooth surfaces results from using chemically strengthened glass. The thin film texture, which is arranged over the substrate, can be formed more easily and without failure, since the thin film texture is formed by a sputtering method. The thin film texture can be processed easily at a low temperature and the recording medium can be manufactured easily since the thin metal film is formed from metals with low melting points.

It should be apparent to those who skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A magnetic recording medium used in a magnetic disk unit, wherein information recorded on the medium is read by a magnetic head, the magnetic head being stopped at a predetermined position on the medium upon completion of the read operation, comprising:

a substrate having a surface;

a data region for recording information, the data region being formed by a magnetic film placed on the surface of the substrate;

a contact area which the magnetic head contacts when stopped;

a laser texture formed by irradiating laser light on the contact area, or on the contact area and the data region, wherein the laser texture comprises a plurality of first projections; and a thin film texture formed by a thin metal film on the data area, or on the contact area and the data area, wherein the thin film texture comprises a plurality of second projections having a height lower than that of the first projections, wherein the thin film texture is formed by sputtering, and wherein the second projections are substantially circular when viewed from the top.

2. The magnetic recording medium in accordance with claim 1, wherein the first projections have an average height of 5 to 100 nm, an average diameter of 1 to 20 μm, and the average distance between the first projections is 1 to 100 μm.

3. The magnetic recording medium in accordance with claim 2, wherein the first projections have an average height of from 10 to 50 nm, an average diameter of 1 to 10 μm, and the average distance between the first projections is 2 to 50 μm.

4. The magnetic recording medium in accordance with claim 1, wherein the second projections have an average height of 1 to 50 nm, an average diameter of 0.1 to 1 μm, and the average distance between the second projections is 0.2 to 10 μm.

5. The magnetic recording medium in accordance with claim 1, wherein the substrate has a light absorbance in the range of 20 to 2000 $mm^{-1}$.

6. The magnetic recording medium in accordance with claim 1, wherein the substrate is formed from soda-lime glass, alumino-silicate glass, or borosilicate glass and is chemically strengthened.

7. The magnetic recording medium in accordance with claim 6, wherein the glass is formed using a float method.

8. The magnetic recording medium in accordance with claim 6, wherein the glass has a ferric oxide content of 0.1 to 11.7 weight %.

9. The magnetic recording medium in accordance with claim 1, wherein the second projections include a thin metal film and a magnetic film, the films being fabricated by sputtering.

10. The magnetic recording medium in accordance with claim 1, wherein the thin metal film is formed of a metal having a low melting point.

11. A magnetic disk used in a magnetic disk unit, wherein information recorded on the magnetic disk is read by a magnetic head, the magnetic head being stopped at a predetermined position on the magnetic disk upon completion of the read operation, comprising:

a substrate having a surface;

a data region for recording information, the data region being formed by a magnetic film placed on the surface of the substrate;

a contact area that the magnetic head contacts when stopped;

a laser texture formed by irradiating laser light on the contact area, wherein the laser texture comprises plurality of first projections; and a thin film texture formed by a thin metal film on the data area, wherein the thin film texture comprises plurality of second projections having a height lower than that of the first projections, wherein the thin film texture is formed by sputtering, and wherein the second projections are substantially circular when viewed from the top.

12. The magnetic disk in accordance with claim 11, wherein the first projections have an average height of 5 to 100 nm, an average diameter of 1 to 20 μm, and an average distance between the first projections is 1 to 100 μm.

13. The magnetic disk in accordance with claim 12, wherein the first projections have an average height of 10 to 50 nm, an average diameter of 1 to 10 μm, and the average distance between the first projections is 2 to 50 μm.

14. The magnetic disk in accordance with claim 11, wherein the second projections have an average height of from 1 to 50 nm, an average diameter of 0.1 to 1 μm, and the average distance between the second projections is 0.2 to 10 μm.

15. The magnetic disk in accordance with claim 11, wherein the substrate has a light absorbance in the range of 20 to 2000 $mm^{-1}$.

16. The magnetic disk in accordance with claim 11, wherein the substrate is formed from soda-lime glass, alumino-silicate glass, or borosilicate glass and is chemically strengthened.

17. The magnetic disk in accordance with claim 16, wherein the glass is manufactured using a float method.

18. A magnetic disk in accordance with claim 16, wherein the glass has a ferric oxide content of 0.1 to 11.7 weight %.

19. The magnetic disk in accordance with claim 11, wherein the second projections include a thin metal film and a magnetic film, the films being fabricated by sputtering.

20. The magnetic disk in accordance with claim 11, wherein the thin metal film is formed from a metal having a low melting point.

* * * * *